(12) United States Patent
Bookheimer (10) Patent No.: US 11,819,925 B2
(45) Date of Patent: Nov. 21, 2023

(54) DAMPER SYSTEM FOR CUTTING TOOL

(71) Applicant: Kennametal Inc., Latrobe, PA (US)

(72) Inventor: Alan J. Bookheimer, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 20 days.

(21) Appl. No.: 17/449,552

(22) Filed: Sep. 30, 2021

(65) Prior Publication Data

US 2023/0094485 A1 Mar. 30, 2023

(51) Int. Cl.
*B23C 5/16* (2006.01)
*B23B 27/00* (2006.01)
*B23C 3/06* (2006.01)
*B23B 27/08* (2006.01)

(52) U.S. Cl.
CPC .......... *B23B 27/002* (2013.01); *B23B 27/083* (2013.01); *B23C 3/06* (2013.01); *B23B 2250/16* (2013.01)

(58) Field of Classification Search
CPC . B23B 27/002; B23B 27/083; B23B 2250/16; B23C 3/06; B23C 5/003; B23C 2250/16
See application file for complete search history.

(56) References Cited

U.S. PATENT DOCUMENTS

| | | | |
|---|---|---|---|
| 6,113,319 A | 9/2000 | Hansson et al. | |
| 9,586,266 B2 | 3/2017 | Eichelberger | |
| 10,179,367 B1 | 1/2019 | Lo | |
| 2015/0056025 A1 | 2/2015 | Guo et al. | |
| 2016/0045960 A1 | 2/2016 | Hecht | |
| 2016/0214182 A1 | 7/2016 | Eichelberger | |
| 2017/0056977 A1* | 3/2017 | Eichelberger | F16F 7/1034 |
| 2017/0173701 A1 | 6/2017 | Hecht et al. | |
| 2018/0009042 A1 | 1/2018 | Chen | |
| 2021/0016359 A1 | 1/2021 | Shidrameshetra et al. | |

FOREIGN PATENT DOCUMENTS

| | | | |
|---|---|---|---|
| CN | 111975048 A | * 11/2020 | ............ B23B 51/00 |
| DE | 102016116164 A1 | 3/2018 | |
| JP | 6155131 B2 | 6/1994 | |
| JP | 2009226548 A | 10/2009 | |
| JP | 2015188982 A | 11/2015 | |

OTHER PUBLICATIONS

English Translation of CN-111975048-A (Year: 2020).*

* cited by examiner

*Primary Examiner* — Alan Snyder
(74) *Attorney, Agent, or Firm* — Christopher J. Owens (57) ABSTRACT

A damper system for a cutting tool is provided having at least one damper body that is added to a cutter body of the cutting tool to help dampen a vibration when the cutting tool is placed in use. The damper body is supported by a damper ring. The damper ring is held in place between a central support boss or hub and an adjustable top cap. The adjustable top cap can be tightened or loosened by use of a fastener element to change the amount of pressure on the damper ring. By adjusting the tension placed on the damper ring, the damper system can be tuned to better suppress vibrations when the cutting tool is placed in use.

26 Claims, 8 Drawing Sheets

DAMPER SYSTEM FOR CUTTING TOOL

CROSS-REFERENCE TO RELATED APPLICATION

Not applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a damper system for a cutting tool. More preferably, this invention provides a damper system for a slotting cutter or a crankshaft cutter.

2. Description of the Background Art

The previous devices for reducing vibration of a cutting tool have been inadequate. Large disk shaped tools will naturally vibrate due to the cutting forces. Adjustable dampers can be added to the tool to help dampen out the vibrations which will reduce chatter, increases tool life, and improves surface finish.

Background technology has used various balance adjusting mechanisms for a milling cutter that requires sets of balls in holes around the peripheral part of a cutter main unit to balance the milling cutter. Further, other devices have been used employing a damping arbor including a rod body and a damping mechanism wherein the rod body includes an end surface for being connected with a cutter head assembly, and the damping mechanism includes at least three shock absorbing assemblies. Machining tools with a vibration absorber and a single central rod as the damper have also been used to control vibrations, as well as employing externally mounted tunable absorber mass to a tool including a cutter body attached to an end surface of a rod body with at least two vibration absorbers. Other technologies have used a cutting tool holder with a vibration damping weight assembly that uses a two piece weight that has the damping ring located between the weighted parts and the tool body. These background technologies have not adequately controlled vibration of the cutting tool.

This invention addresses the above disadvantages of prior art by incorporating a damper body and damper ring into a system for a cutting tool.

SUMMARY OF THE INVENTION

A damper system for a cutting tool is provided.

In another embodiment of the damper system of a cutting tool of this invention, a cutting tool (10) is provided comprising at least one ring of heavy metal (i.e. a damper body (26)) that is added to the disk (i.e. cutter body (12)) of the cutting tool (10) to help dampen a vibration when the cutting tool is placed in use. The damper body (26) is supported by a central elastomeric (i.e. rubber or other polymer) damper ring (66) (i.e. for example, an o-ring). The damper ring (66) is held in place between a central support boss (i.e. for example, a hub (54)) and an adjustable top cap (36). The adjustable top cap (36) can be tightened or loosened by use of a fastener element (74) (i.e. for example, a screw, pin, rivet, bolt, other connectors) to change the amount of pressure on the damper ring (66). By adjusting the tension placed on the damper ring (66), the dampening system can be tuned to better suppress vibrations when the cutting tool is placed into service. The damper body has a grooved recess (35). The damper ring (66) has a circular toroid shaped top exterior surface (68) and a circular toroid shaped bottom exterior surface (70), and a hole or void (72) located in a center (71) of the damper ring (66).

In another embodiment of a damper system for a cutting tool of this invention, a cutter body (12) is provided having a longitudinal axis ($A_1$-$A_2$), a first side surface (14) and a second side surface (16), and a middle surface (18) that is in juxtaposition to and between the first side surface (14) of the cutter body (12) and the second side surface (16) of the cutter body (12); at least one cutting insert (20) positioned on the middle surface (18) of the cutter body (12); at least one peripheral recess (22) formed in the cutter body (12) having a peripheral recess axis ($B_1$-$B_2$) extending transversely to the longitudinal axis ($A_1$-$A_2$), and wherein the peripheral recess (22) opens out to the first side surface (14) of the cutter body (12), the peripheral recess (22) having an interior surface (24), and wherein the peripheral recess (22) is located at a periphery (23) of the cutter body (12), and wherein the peripheral recess (22) has an interior rear wall (46), wherein the interior rear wall (46) has a front face (48), and wherein the interior rear wall (46) has an interior rear wall hub (54) positioned on the front face (48), the interior rear wall hub (54) having an exterior surface (56), an interior surface (58), and a top surface (60) wherein the top surface (60) of the interior rear wall hub (54) is in juxtaposition to and disposed between the exterior surface (56) of the interior rear wall hub (54) and the interior surface (58) of the interior rear wall hub (54), and wherein the exterior surface (56) of the interior rear wall hub (54) has a vertical height (62) that extends vertically from the front face (48) of the interior rear wall (46) extending along the peripheral recess axis ($B_1$-$B_2$), and a blind hole or void (64) that extends from the top surface (60) of the interior rear wall hub (54) through the interior surface (58) of the interior rear wall hub (54) to the front face (48) of the interior rear wall (46), and wherein the blind hole or void (64) extending along the peripheral recess axis ($B_1$-$B_2$); a damper body (26) having a first face (28), a second face (30), and a middle section (32) that is in juxtaposition to and disposed between the first face (28) of the damper body (26) and the second face (30) of the damper body (26), and a hole or void (34) that extends from the first face (28) of the damper body (26) through the middle section (32) of the damper body (26) and through the second face (30) of the damper body (26) and wherein the hole or void (34) extending along the peripheral recess axis ($B_1$-$B_2$), and wherein the hole or void (34) is formed by a wall (33) and wherein the wall (33) has a grooved recess (35); a cap (36) having a front face (38), a back face (40), and a middle section (42) that is in juxtaposition to and disposed between the front face (38) of the cap (36) and the back face (40) of the cap (36), and wherein the front face (38) of the cap (36) is opposite to the back face (40) of the cap (36), and a hole or void (44) that extends from the front face (38) of the cap (36) through the middle section (42) of the cap (36) and through the back face (40) of the cap (36) and whereon the hole or void (44) extending along the peripheral recess axis ($B_1$-$B_2$), and a first hub (120) positioned on the back face (40) of the cap (36), and wherein the first hub (120) has a vertical height (126) that extends in a vertical direction from the back face (40) of the cap (36) along the peripheral recess axis ($B_1$-$B_2$), and wherein the first hub (120) has a hole or void (128) that extends from a top surface (124) of the first hub (120) through the interior surface (123) of the first hub (120) to the front face (38) of the cap (36), the hole or void (128) is in communication with the hole or void (44) of the front face (38) of the cap (36), the hole or void (44) and the hole or void (128) extending in a vertical direction along the peripheral recess axis ($B_1$-$B_2$), and wherein the back face (40) of the cap (36) is in juxtaposition to the first face (28) of the damper body (26); a damper ring (66) having a circular toroid shaped top exterior surface (68) and a circular toroid shaped bottom exterior surface (70), and a hole or void (72) located in a center (71) of the damper ring (66) and wherein the hole or void (72) of the damper ring (66) extending along the peripheral recess axis ($B_1$—$B_2$), the damper ring (66) located within the grooved recess (35) of the damper body (26); a fastener element (74) having a length extending along the peripheral recess axis ($B_1$-$B_2$) through the hole or void (44) of the cap (36), the hole or void (34) of the damper body (26), the hole or void (72) of the damper ring (66), and into at least a portion of the blind hole or void (64) of the interior rear wall hub (54); a center aperture (90) formed in the slotting cutter body (12) and having an aperture axis ($C_1$-$C_2$) extending transversely to the longitudinal axis ($A_1$-$A_2$), and wherein the center aperture (90) of the cutter body (12) opens out to both the first side surface (14) of the cutter body (12) and the second side surface (16) of the cutter body (12); and a machine connection member (100) positioned on the second side surface (16) of the cutter body (12).

Another embodiment of the damper system for a cutting tool of this invention provides wherein a blind hole or void (64) of an interior rear wall hub (54) is threaded, and wherein the fastener element (74) is threaded.

In another embodiment of this invention, a damper system for a slotting cutter or a crankshaft cutter is provided.

These and other embodiments of this invention shall be described in more detail herein and in the drawings that show certain embodiments of this invention.

BRIEF DESCRIPTION OF THE DRAWINGS

While various embodiments of this invention are illustrated in the drawings, the particular embodiments shown should not be construed to limit the claims. Various modifications and changes may be made without departing from the scope of this invention.

DETAILED DESCRIPTION OF THE INVENTION

During a cutting operation, any vibration between a cutting tool and a material being cut may lead to undesirable cutting performances, and a loss in productivity. To reduce this undesirable vibration, a damper system for cutting tools is provided in this invention. It will be appreciated that the principles of the invention may be applied to many types of cutting tools, including, but not limited to slotting cutters and crankshaft cutters.

Referring to FIGS. 1-11, an embodiment of the damper system of a cutting tool (10) of this invention is provided comprising at least one ring of heavy metal (i.e. a damper body (26)) that is added to the disk (i.e. cutter body (12)) of the cutting tool (10) to help dampen any vibration that is placed upon the cutting tool when placed into service. The damper body (26) is supported by a central elastomeric (i.e. rubber or other polymer) damper ring (66) (i.e. for example, an o-ring). The damper ring (66) is held in place between a central support boss (i.e. for example, a hub (54)) and an adjustable top cap (36). The adjustable top cap (36) can be tightened or loosened by use of a fastener element (74) (i.e. for example, a screw, pin, rivet, bolt, other connectors) to change the amount of pressure on the damper ring (66). By adjusting the tension placed on the damper ring (66), the dampening system can be tuned to better suppress vibrations. The damper body has a grooved recess (35). The damper ring (66) has a circular toroid shaped top exterior surface (68) and a circular toroid shaped bottom exterior surface (70), and a hole or void (72) located in a center (71) of the damper ring (66).

Referring to FIGS. 1-12, a certain embodiment of a damper system for a cutting tool of this invention is provided comprising a cutter body (12), the cutter body (12) having a longitudinal axis ($A_1$-$A_2$), a first side surface (14) and a second side surface (16), and a middle surface (18) that is in juxtaposition to and between the first side surface (14) of the cutter body (12) and the second side surface (16) of the cutter body (12); at least one cutting insert (20) positioned on the middle surface (18) of the cutter body (12); at least one peripheral recess (22) formed in the cutter body (12) having a peripheral recess axis ($B_1$-$B_2$) extending transversely to the longitudinal axis ($A_1$-$A_2$), and wherein the peripheral recess (22) opens out to the first side surface (14) of the cutter body (12), the peripheral recess (22) having an interior surface (24), and wherein the peripheral recess (22) is located at a periphery (23) of the cutter body (12), and wherein the peripheral recess (22) has an interior rear wall (46), wherein the interior rear wall (46) has a front face (48), and wherein the interior rear wall (46) has an interior rear wall hub (54) positioned on the front face (48), the interior rear wall hub (54) having an exterior surface (56), an interior surface (58), and a top surface (60) wherein the top surface (60) of the interior rear wall hub (54) is in juxtaposition to and disposed between the exterior surface (56) of the interior rear wall hub (54) and the interior surface (58) of the interior rear wall hub (54), and wherein the exterior surface (56) of the interior rear wall hub (54) has a vertical height (62) that extends vertically from the front face (48) of the interior rear wall (46) extending along the peripheral recess axis ($B_1$-$B_2$), and a hole or void (64) that extends from the top surface (60) of the interior rear wall hub (54) through the interior surface (58) of the interior rear wall hub (54) through the front face (48) of the interior rear wall (46), and toward said second side surface (16) of said cutter body (12), and optionally through the second side surface (16) of the cutter body (12), and wherein the hole or void (64) extending along the peripheral recess axis ($B_1$-$B_2$); a damper body (26) having a first face (28), a second face (30), and a middle section (32) that is in juxtaposition to and disposed between the first face (28) of the damper body (26) and the second face (30) of the damper body (26), and a hole or void (34) that extends from the first face (28) of the damper body (26) through the middle section (32) of the damper body (26) and through the second face (30) of the damper body (26) and wherein the hole or void (34) extending along the peripheral recess axis ($B_1$-$B_2$), and wherein the hole or void (34) is formed by a wall (33) and wherein the wall (33) has a grooved recess (35); a cap (36) having a front face (38), a back face (40), and a middle section (42) that is in juxtaposition to and disposed between the front face (38) of the cap (36) and the back face (40) of the cap (36), and wherein the front face (38) of the cap (36) is opposite to the back face (40) of the cap (36), and a hole or void (44) that extends from the front face (38) of the cap (36) through the middle section (42) of the cap (36) and through the back face (40) of the cap (36) and whereon the hole or void (44) extending along the peripheral recess axis ($B_1$-$B_2$), and a first hub (120) positioned on the back face (40) of the cap (36), and wherein the first hub (120) has a vertical height (126) that extends in a vertical direction from the back face (40) of the cap (36) along the peripheral recess axis ($B_1$-$B_2$), and wherein the first hub (120) has a hole or void (128) that extends from a top surface (124) of the first hub (120) through the interior surface (123) of the first hub (120) to the front face (38) of the cap (36), the hole or void (128) is in communication with the hole or void (44) of the front face (38) of the cap (36), the hole or void (44) and the hole or void (128) extending in a vertical direction along the peripheral recess axis ($B_1$-$B_2$), and wherein the back face (40) of the cap (36) is in juxtaposition to the first face (28) of the damper body (26); a damper ring (66) having a circular toroid shaped top exterior surface (68) and a circular toroid shaped bottom exterior surface (70), and a hole or void (72) located in a center (71) of the damper ring (66) and wherein the hole or void (72) of the damper ring (66) extending along the peripheral recess axis ($B_1$—$B_2$), the damper ring (66) located within the grooved recess (35) of the damper body (26); a fastener element (74) having a length extending along the peripheral recess axis ($B_1$—$B_2$) through the hole or void (44) of the cap (36), the hole or void (34) of the damper body (26), the hole or void (72) of the damper ring (66), and into at least a portion of the hole or void (64) of the interior rear wall hub (54); a center aperture (90) formed in the slotting cutter body (12) and having an aperture axis ($C_1$-$C_2$) extending transversely to the longitudinal axis ($A_1$-$A_2$), and wherein the center aperture (90) of the cutter body (12) opens out to both the first side surface (14) of the cutter body (12) and the second side surface (16) of the cutter body (12); and a machine connection member (100) positioned on the second side surface (16) of the cutter body (12).

Another embodiment of the damper system for a cutting tool of this invention provides wherein the hole or void (64) of the interior rear wall hub (54) is threaded, and wherein the fastener element (74) is threaded.

The first face (28) of the damper body (26) is opposite to the second face (30) of the damper body (26). The damper ring (66) has a circular toroid shaped top exterior surface (68) is opposite to said circular toroid shaped bottom exterior surface (70). The damper ring (66) is located within said grooved recess (35) of said damper body (26) and in juxtaposition to and in communication with said top surface (60) of said interior rear wall hub (54) of said interior rear wall (46). The center aperture (90) of the cutter body (12) has an interior surface (92), and wherein said center aperture (90) of the cutter body (12) is located in a center (94) of the cutter body (12).

The fastener element of this invention may be for example, but not limited to, a screw, bolt, rivet, pin, or the like. In one embodiment of this invention, the fastener element (74) has a head (76) and an elongated body (80) that extends below the head (76) of the fastener element (74), wherein the head (76) has a recessed detent (78), and wherein the elongated body (80) of the fastener element (74) has a length extending along the peripheral recess axis ($B_1$-$B_2$) through the hole or void (44) of the cap (36), the hole or void (34) of the damper body (26), the hole or void (72) of the damper ring (66), and into at least a portion of the hole or void (64) of the interior rear wall hub (54), and optionally wherein the fastener element (74) is in engagement with at least a portion of the interior surface (58) of the interior rear wall hub (54). In one embodiment of this invention, the fastener element (74) is in threaded engagement with at least a portion of the hole or void (64) of the interior rear wall hub (54).

While it will be appreciated that the damper system of this invention may be used with a cutting tool of various uses, the damper system is preferably used with a slotting cutter or a crankshaft cutter. FIGS. 1, 2, 3, 7, and 8 show an example of the damper system of this invention with a slotting cutter.

Another embodiment of this invention shows the damper system of a cutting tool (10) wherein the first hub (120) has an exterior surface (122), and interior surface (123), and wherein the top surface (124) of the first hub (120) is in juxtaposition to and disposed between the exterior surface (122) of the first hub (120) and the interior surface (123) of the first hub (120).

Figure 2:
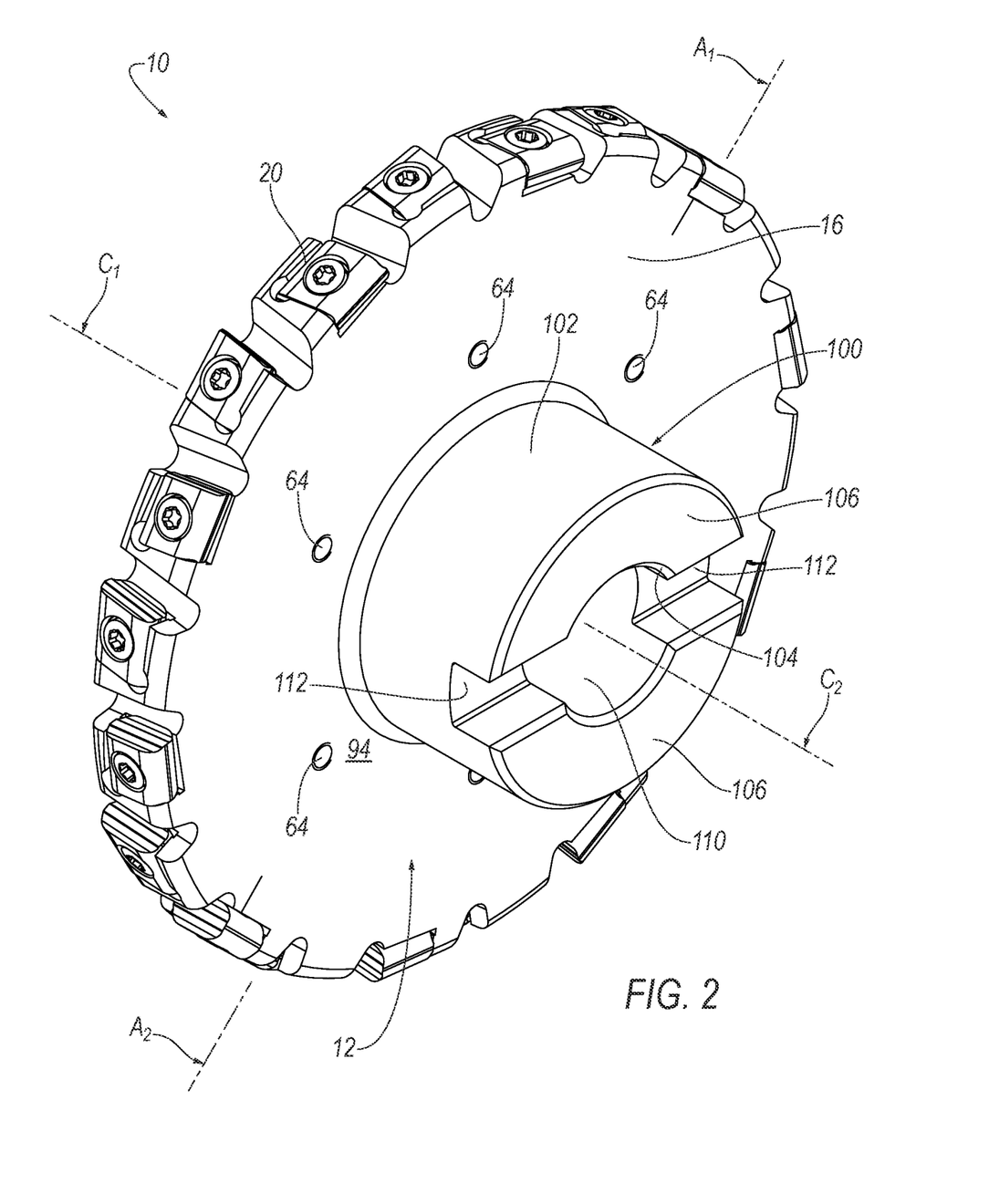
FIG. 2 shows an isometric view of the second side surface and the middle surface of the slotting cutter of this invention.

In another embodiment of this invention, FIG. 2 shows the damper system of a cutting tool (10) wherein the machine connection member (100) has an exterior surface (102), an interior surface (104), and a top surface (106) that is in juxtaposition to and disposed between the exterior surface (102) of the machine connection member (100) and the interior surface (104) of the machine connection member (100). In certain alternate embodiments, the machine connection member (100) may have a bottom surface (108) that is in juxtaposition to and disposed between the exterior surface (102) of the machine connection member (100) and the interior surface (104) of the machine connection member (100), and wherein the bottom surface (108) of the machine connection member (100) is opposite to the top surface (106) of the machine connection member (100). There is a hole or void (110) within the machine connection member (100) that extends through the interior surface (104) of the machine connection member (100) and through the top surface (106) of the machine connection member (100), wherein the hole or void (110) of the machine connection member (100) extending along the center aperture axis ($C_1$-$C_2$), and wherein the hole or void (110) of the machine connection member (100) opens out to both the top surface (106) of the machine connection member (100) and the bottom surface (108) of said machine connection member (100) and the center aperature (90) of the slotting cutter body (12).

Figure 1:
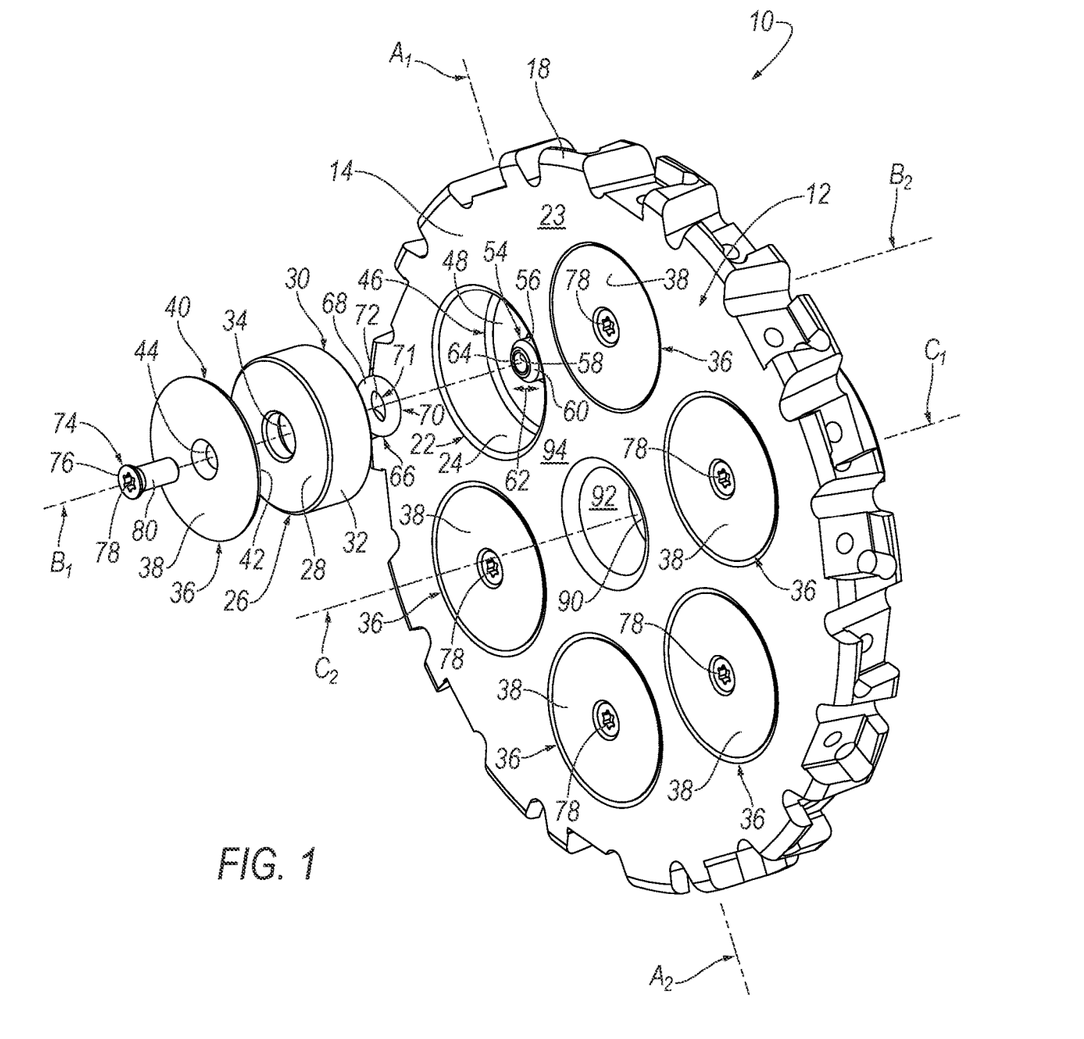
FIG. 1 shows an exploded isometric view of the first side surface and the middle surface of the slotting cutter of this invention.
Figure 3:
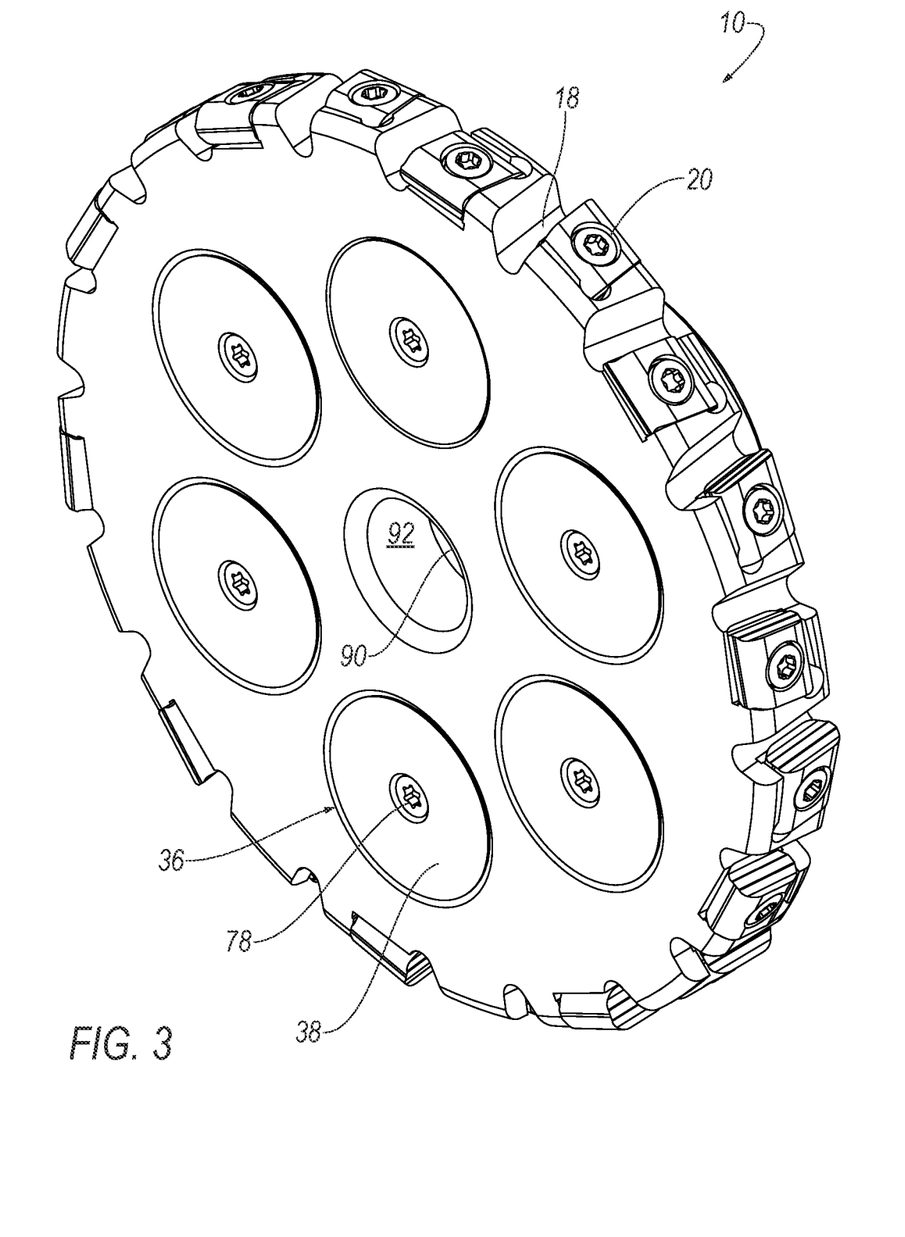
FIG. 3 shows an isometric view of the first side surface and the middle surface of the slotting cutter of this invention.
Figure 4:
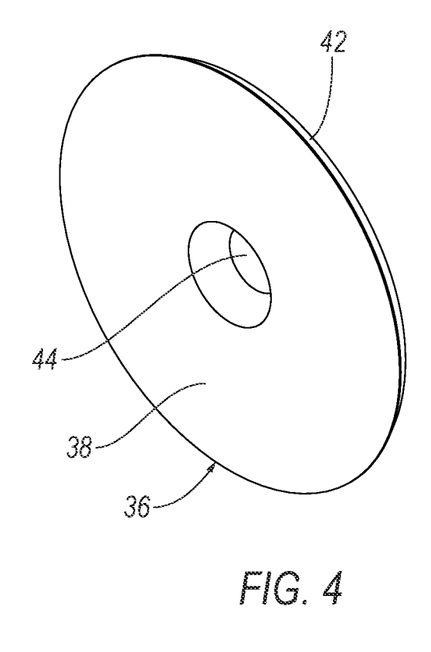
FIG. 4 shows the front face of the cap of this invention.
Figure 5:
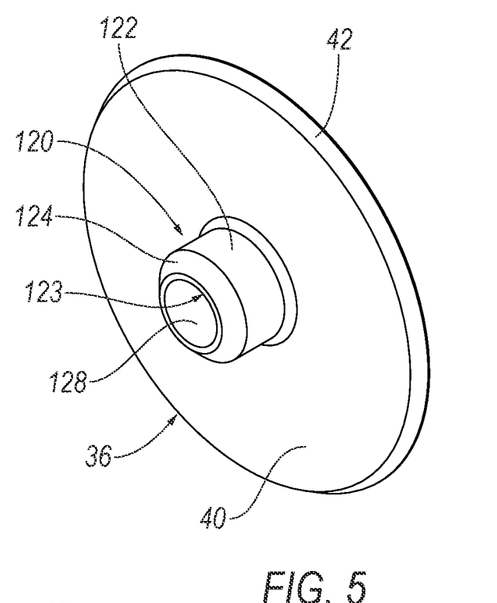
FIG. 5 shows the back face of the cap of this invention.
Figure 6:
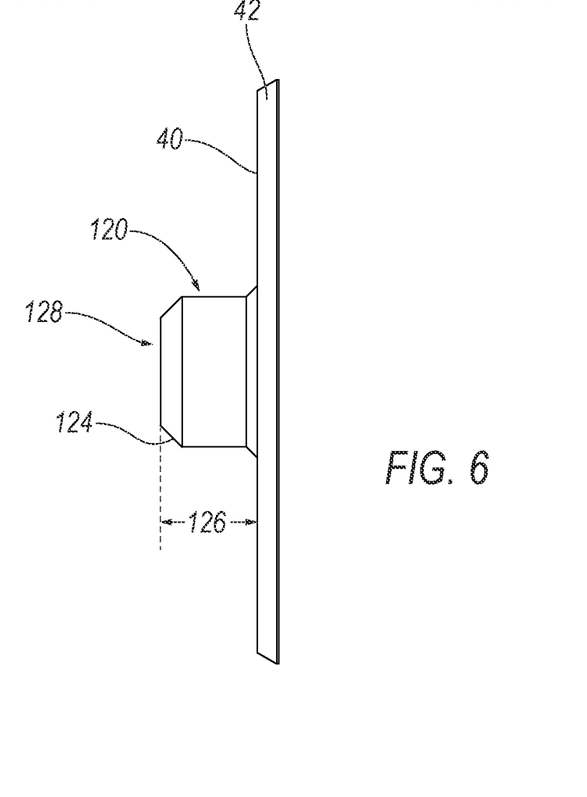
FIG. 6 shows a side view of the cap of this invention.
Figure 7:
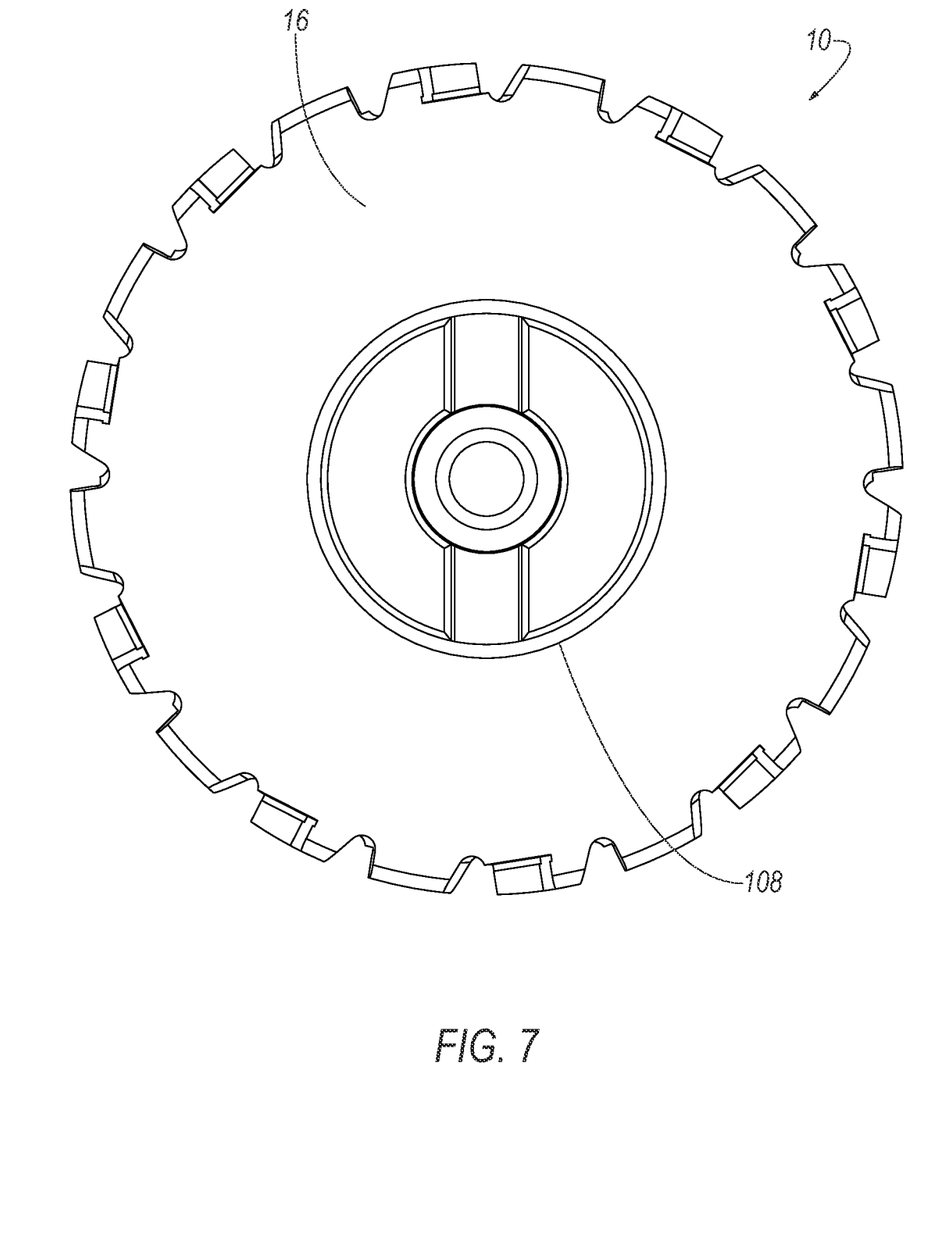
FIG. 7 shows an alternate embodiment of a top view of the second side surface of the slotting cutter of this invention.
Figure 8:
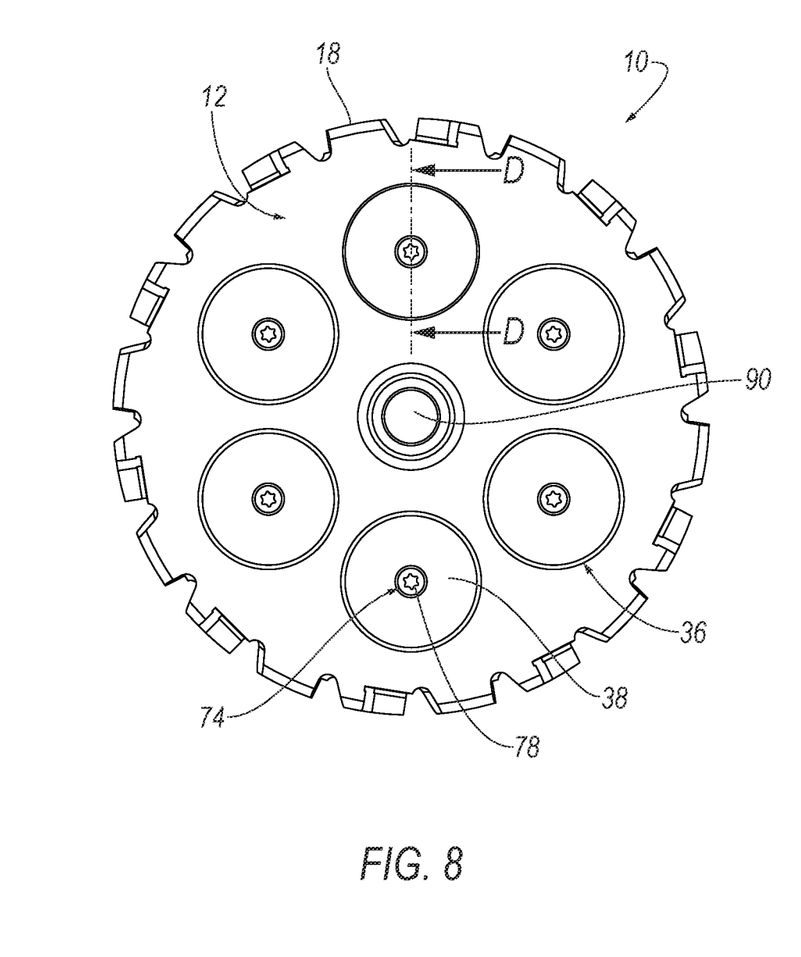
FIG. 8 shows a top view of the first side surface of the slotting cutter of this invention.
Figure 9:
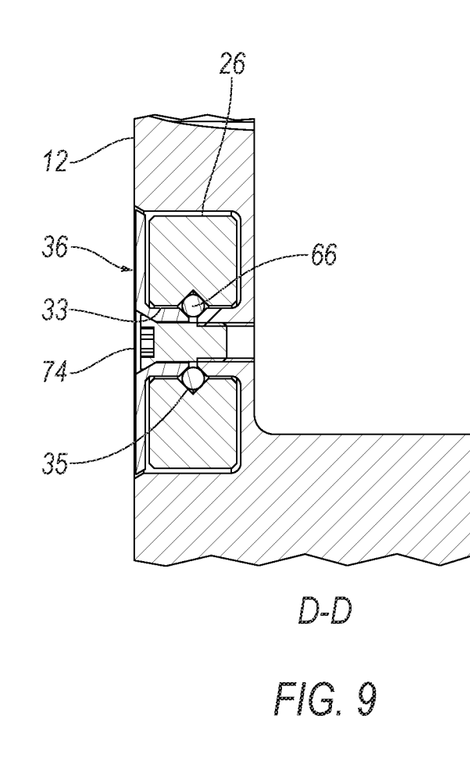
FIG. 9 shows a sectional view taken along D-D of FIG. 8 of the damper body, damper ring, grooved recess, and fastening element of the slotting cutter of this invention.
Figure 10:
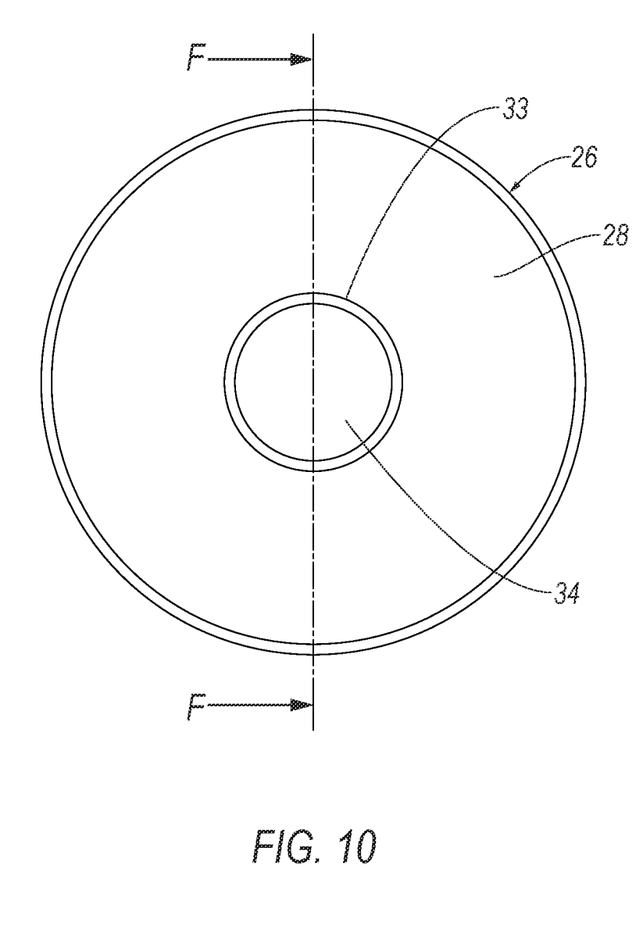
FIG. 10 shows a top view of the damper body of this invention.
Figure 11:
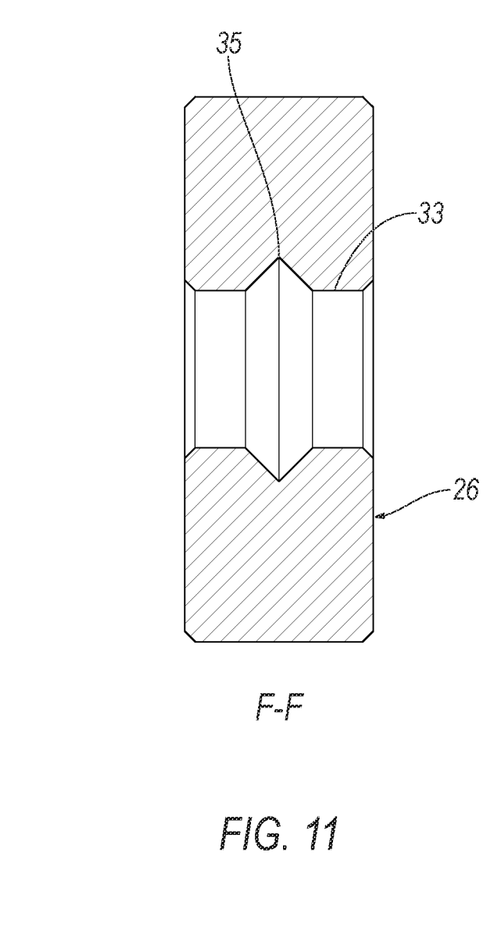
FIG. 11 shows a cross-section view taken along F-F of FIG. 10 of the damper body of this invention.
Figure 12:
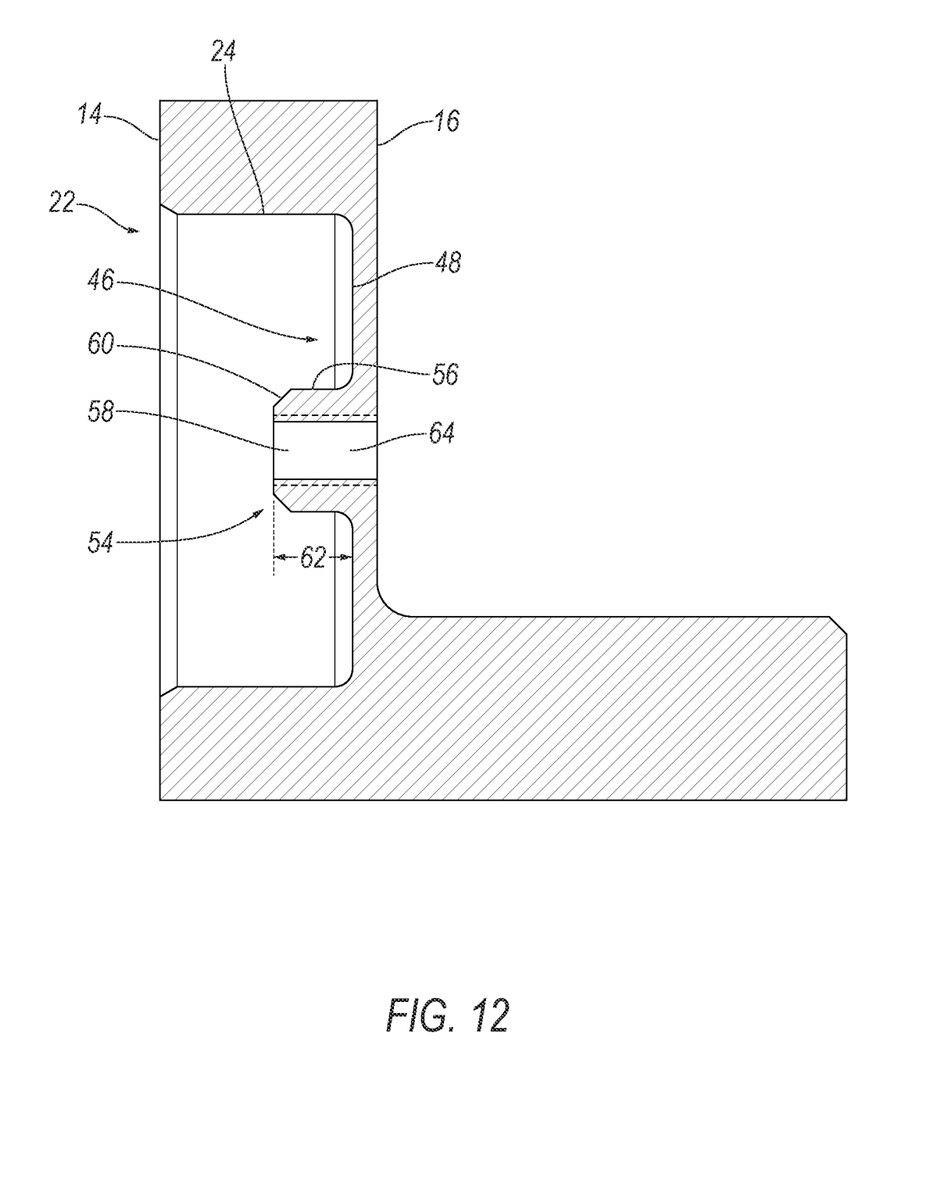
FIG. 12 shows a cross-section view of the peripheral recess of this invention.

FIGS. 1, 3, and 8 show an embodiment of this invention's damper system with a slotting cutter wherein the cutting tool (10) has six peripheral recesses (22) formed in the cutter body (12). It will be appreciated by those persons of skill in the art that each of the peripheral recesses (22) of the slotting cutter body (12) is fitted with a cap (36), a damper body (26), a damper ring (66), and a fastener element (74). It will be appreciated by those persons skilled in the art that other embodiments of this invention include one or more peripheral recesses in the cutting tool.

Another embodiment of this damper system of a cutting tool of this invention, as shown in FIG. 2 is provided, includes a cutting tool wherein a notch (112) is located on the top surface (106) of the machine connection member (100).

FIGS. 2-3 show an embodiment of this invention wherein the damper system of a cutting tool (10) is a slotting cutter having twenty cutting inserts (20) positioned on the middle surface (18) of the cutter body (12). It will be appreciated by those persons skilled in the art that other embodiments of this invention provides a cutting tool (10) having at least one or more cutting inserts (20) positioned on the middle surface (18) of the cutter body (12).

The damper system of a cutting tool of this invention has a fastener element (74) that secures the cap (36) in juxtaposition to the damper body (26), and the damper ring (66) that is located in the grooved recess (35) of the damper body (26) in juxtaposition to the top surface (60) of the interior rear wall hub (54). The back face (40) of the cap (36) is in juxtaposition to and in communication with the first face (28) of the damper body (26), wherein the damper ring (66) is positioned in the grooved recess (35) of the damper body (26), and wherein the circular toroid shaped bottom exterior surface (70) of the damper ring (66) is in juxtaposition to and in communication with the top surface (60) of the interior rear wall hub (54).

In another embodiment of this invention, it will be appreciated by those persons of skill in the art, that head (76) of the fastener element (74) has a larger diameter relative to a diameter of the elongated body (80) of the fastener element (74), wherein the diameter of the head (76) of the fastener element (74) is larger relative to a diameter of the void or hole (44) of the cap (36). The head (76) of the fastener element (74) is recessed into the hole or void (44) of the cap (36).

The damper system of a cutting tool of this invention has a fastener element (74) that is in adjustable engagement with at least a portion of the interior surface (58) of the interior rear wall hub (54) such that the damper body (26) may be loosened from communication from the back face (40) of the cap (36).

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

It will be appreciated by those persons skilled in the art that changes could be made to embodiments of the present invention described herein without departing from the broad inventive concept thereof. It is understood, therefore, that this invention is not limited by any particular embodiments disclosed, but is intended to cover the modifications that are within the spirit and scope of the invention.

Whereas particular embodiments of this invention have been described above for purposes of illustration, it will be evident to those persons skilled in the art that numerous variations of the details of the present invention may be made without departing from the invention as defined in the appended claims.

What is claimed is:

1. A damper system of a cutting tool comprising a cutting tool having at least one damper body that is added to a cutter body of said cutting tool, wherein said damper body is supported by a damper ring, wherein said damper ring is held in place between a hub and an adjustable top cap, wherein said adjustable top cap is tightened or loosened by use of a fastening element.

2. The damper system of a cutting tool of claim 1, wherein said fastening element is tightened or loosened to change an amount of pressure or tension exerted on said damper ring.

3. The damper system of a cutting tool of claim 2, wherein said amount of pressure or tension placed upon said damper ring allows for tuning of the damper system to suppress a vibration on said cutting tool.

4. The damper system of a cutting tool of claim 1 wherein said damper body has a grooved recess.

5. The damper system of a cutting tool of claim 4, wherein said damper ring has a circular toroid shaped top exterior surface and a circular toroid shaped bottom exterior surface, and a hole or void located in a center of said damper ring.

6. A cutting tool comprising:
   a cutter body, said cutter body having a longitudinal axis ($A_1$-$A_2$), a first side surface and a second side surface, and a middle surface that is in juxtaposition to and between said first side surface of said cutter body and said second side surface of said cutter body;
   at least one cutting insert positioned on said middle surface of said cutter body;

at least one peripheral recess formed in said cutter body (12) having a peripheral recess axis ($B_1$-$B_2$) extending transversely to said longitudinal axis ($A_1$-$A_2$), and wherein said peripheral recess opens out to said first side surface of said cutter body, said peripheral recess having an interior surface, and wherein said peripheral recess is located at a periphery of said cutter body, and wherein said peripheral recess has an interior rear wall, wherein said interior rear wall has a front face, and wherein said interior rear wall has an interior rear wall hub positioned on said front face, said interior rear wall hub having an exterior surface an interior surface, and a top surface wherein said top surface of said interior rear wall hub is in juxtaposition to and disposed between said exterior surface of said interior rear wall hub and said interior surface of said interior rear wall hub, and wherein said exterior surface of said interior rear wall hub has a vertical height that extends vertically from said front face of said interior rear wall extending along said peripheral recess axis ($B_1$-$B_2$), and a hole or void that extends from said top surface of said interior rear wall hub through said interior surface of said interior rear wall hub through said front face of said interior rear wall, and towards said second side surface of said cutter body, and optionally through said second side surface of said cutter body, and wherein the hole or void extends along said peripheral recess axis ($B_1$-$B_2$);

a damper body having a first face, a second face, and a middle section that is in juxtaposition to and disposed between said first face of said damper body and said second face of said damper body, and a hole or void that extends from said first face of said damper body through said middle section of said damper body and through said second face of said damper body and wherein said hole or void extending along said peripheral recess axis ($B_1$-$B_2$), and wherein said hole or void is formed by a wall and wherein said wall has a grooved recess;

a cap having a front face, a back face, and a middle section that is in juxtaposition to and disposed between said front face of said cap and said back face of said cap, and wherein said front face of said cap is opposite to said back face of said cap, and a hole or void that extends from said front face of said cap through said middle section of said cap and through said back face of said cap and whereon said hole or void extending along said peripheral recess axis ($B_1$-$B_2$), and a first hub positioned on said back face of said cap, and wherein said first hub has a vertical height that extends in a vertical direction from said back face of said cap along said peripheral recess axis ($B_1$-$B_2$), and wherein said first hub has a hole or void that extends from a top surface of said first hub through said interior surface of said first hub to said front face of said cap, said hole or void is in communication with said hole or void of said front face of said cap, said hole or void of said front face of the cap and said hole or void of said first hub extending in a vertical direction along said peripheral recess axis ($B_1$-$B_2$), and wherein said back face of said cap is in juxtaposition to said first face of said damper body;

a damper ring having a circular toroid shaped top exterior surface and a circular toroid shaped bottom exterior surface, and a hole or void located in a center of said damper ring and wherein said hole or void of said damper ring extending along said peripheral recess axis ($B_1$-$B_2$), said damper ring located within said grooved recess of said damper body;

a fastener element having a length extending along said peripheral recess axis ($B_1$-$B_2$) through said hole or void of said cap, said hole or void of said damper body, said hole or void of said damper ring, and into at least a portion of said hole or void of said interior rear wall hub;

a center aperture formed in said slotting cutter body and having an aperture axis ($C_1$-$C_2$) extending transversely to said longitudinal axis ($A_1$-$A_2$), and wherein said center aperture of said cutter body opens out to both said first side surface of said cutter body and said second side surface of said cutter body; and a machine connection member positioned on said second side surface of said cutter body.

7. The cutting tool of claim 6 wherein said hole or void of said interior rear wall hub is threaded.

8. The cutting tool of claim 7 wherein said fastener element is threaded.

9. The cutting tool of claim 6 wherein said first face of said damper body is opposite to the second face of said damper body.

10. The cutting tool of claim 6 wherein said circular toroid shaped top exterior surface is opposite to said circular toroid shaped bottom exterior surface.

11. The cutting tool of claim 6, wherein said damper ring is located within said grooved recess of said damper body and in juxtaposition to and in communication with said top surface of said interior rear wall hub of said interior rear wall.

12. The cutting tool of claim 6, wherein said center aperture of said cutter body has an interior surface, and wherein said center aperture of said cutter body is located in a center of said cutter body.

13. The cutting tool of claim 6 wherein said fastener element has a head and an elongated body that extends below said head of said fastener, wherein said head has a recessed detent, and wherein said elongated body of said fastener element has a length extending along said peripheral recess axis ($B_1$-$B_2$) through said hole or void of said cap, said hole or void of said damper body, said hole or void of said damper ring, and into at least a portion of said hole or void of said interior rear wall hub, and optionally wherein said fastener element is in engagement with at least a portion of said interior surface of said interior rear wall hub.

14. The cutting tool of claim 8, wherein said fastener element is in threaded engagement with at least a portion of said hole or void of said interior rear wall hub.

15. The cutting tool of claim 6 wherein said cutting tool is a slotting cutter or a crankshaft cutter.

16. The cutting tool of claim 6, wherein said first hub has an exterior surface, and interior surface, and wherein said top surface of said first hub is in juxtaposition to and disposed between said exterior surface of said first hub and said interior surface of said first hub.

17. The cutting tool of claim 6 wherein said machine connection member has an exterior surface, an interior surface, and a top surface that is in juxtaposition to and disposed between said exterior surface of said machine connection member and said interior surface of said machine connection member, and a hole or void with said machine connection member that extends through said interior surface of said machine connection member and through said top surface of said machine connection member, wherein said hole or void of said machine connection member extending along said center aperture axis ($C_1$-$C_2$), and wherein said hole or void of said machine connection member opens out to both said top surface of said machine connection member and said center aperture of said slotting cutter body.

18. The cutting tool of claim 6 having six peripheral recesses formed in said cutter body.

19. The cutting tool of claim 18 wherein each of said peripheral recesses of said slotting cutter body is fitted with said cap, said damper body, said damper ring, and said fastener element.

20. The cutting tool of claim 17 wherein a notch is located on said top surface of said machine connection member.

21. The cutting tool of claim 15 wherein said cutting tool is a slotting cutter having twenty cutting inserts positioned on said middle surface of said cutter body.

22. The cutting tool of claim 16 wherein said fastener element secures said cap in juxtaposition to said damper body, and said damper ring in said grooved recess of said damper body in juxtaposition to said top surface of said interior rear wall hub.

23. The cutting tool of claim 10 wherein said back face of said cap is in juxtaposition to and in communication with said first face of said damper body, wherein said damper ring is positioned in said grooved recess of said damper body, and wherein said circular toroid shaped bottom exterior surface of said damper ring is in juxtaposition to and in communication with said top surface of said interior rear wall hub.

24. The cutting tool of claim 13 wherein said head of said fastener element has a larger diameter relative to a diameter of said elongated body of said fastener element, wherein said diameter of said head of said fastener element is larger relative to a diameter of said void or hole of said cap.

25. The cutting tool of claim 13 wherein said head of said fastener element is recessed into said hole or void of said cap.

26. The cutting tool of claim 6 wherein said fastener element is in adjustable engagement with at least a portion of said interior surface of said interior rear wall hub such that said damper body may be loosened from engagement from said back face of said cap.

* * * * *